INVENTORS
Karl Butter
Willibald Wittich
Armin Theiß

INVENTORS
Karl Butter
Willibald Wittich
Armin Theiß
By McGlew and Toren
ATTORNEYS United States Patent Office 3,686,081
Patented Aug. 22, 1972

3,686,081
METHOD FOR INCORPORATING STRENGTH
INCREASING FILLER MATERIALS IN A
MATRIX
Karl Butter, Munich, Willibald Wittich, Ottobrunn, and
Armin Theiss, Munich, Germany, assignors to Messer-
schmitt-Bolkow-Blohm Gesellschaft mit beschrankter
Haftung, Munich, Germany
Filed Jan. 19, 1970, Ser. No. 3,942
Claims priority, application Germany, Jan. 31, 1969,
P 19 04 715.5
Int. Cl. C23b 7/00, 7/02; B65h 81/00
U.S. Cl. 204—16
19 Claims

ABSTRACT OF THE DISCLOSURE

A method for incorporating strength increasing filler materials in a matrix which is produced at least partly by electrolytic plating or by similar galvanoplastic means comprising directing the filler material over the surface of the receiving material and either starting or continuing the electrolytic process to deposit a further amount of material over the filler and to bond it to the receiving material. An internal combustion engine such as a rocket thrust engine is advantageously formed with a wall having longitudinally extending cooling channels and these channels are closed at the top by a deposit of electro-plated material. The entire walls are then reinforced by encircling the deposited material with one or more reinforcing bands and by adding a further deposit of electro-plated material to enclose the filler material and to bond it within the covering wall. In some instances it is desirable to recess or groove the receiving surface for the filler material so that the filler material may fit into grooves to facilitate the electro-plating and the bonding of the filler in position.

SUMMARY OF THE INVENTION

This invention relates in general to the construction of reinforced articles and to an improved method of making such articles and in particular to a new and useful reinforced metal structure which includes a structurally strong filler material which is bonded within the finished wall by electro-plated material and to an improved method of making structural walls.

In order to increase the strength of an article it is known to incorporate filler materials either in the form of microparticles like monocrystals, whiskers, thin filaments such as rods, wires and the like. The filler materials are either fused in, sintered in, cemented or cast. The known methods did not always lead to satisfactory results or they required great expenditures.

In accordance with the present invention, there is provided an improved method for incorporating a strength increasing filler material into a metal part or matrix which is produced at least partly by electro-plating means. This is done by providing the original part of the material with the filler material on its surface and starting or continuing the electro-plating to cover the material and to bond the filler within the finished wall thereof. In a preferred embodiment of the invention a reinforcing band of great strength is used as a filler material, for example a spring or strip wire or a wire cable or rope. In some instances, it is desirable to form depressions into the receiving surface which corresponds in outline to that of the configuration of the filler material. In some instances, the filler material is applied in the depressions or onto the surface and held thereon under initial stress.

With the method of the invention, there is a considerable improvement of the strength of the original material similar to the compound material iron-concrete or reinforced concrete. The form of the resultant product can be plate shaped or of a more complicated form. In any case the reinforcement with the filler material can be adapted to the necessary stresses and to the direction of the action of the main stresses during operation so that particularly good structural characteristics may be achieved.

Accordingly it is an object of the invention to provide an improved method for incorporating a strength increasing filler material into an article which includes placing the filler material on the surface of the formed part of the article and building up the remaining portion of the wall by electroplating material over the surface and over the filler material to bond it within the wall.

A further object of the invention is to provide an improved structure having an outer portion formed of electro-plated material with reinforcing elements bonded within the electro-plated material.

A further object of the invention is to provide a thrust engine combustion chamber which includes a wall having a plurality of longitudinally extending grooves therein and which is covered by an electro-plated material, the electro-plated material having a plurality of encircling bands therein forming a filler material for structurally reinforcing the whole wall structure.

A further object of the invention is to provide an improved structurally strong article which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
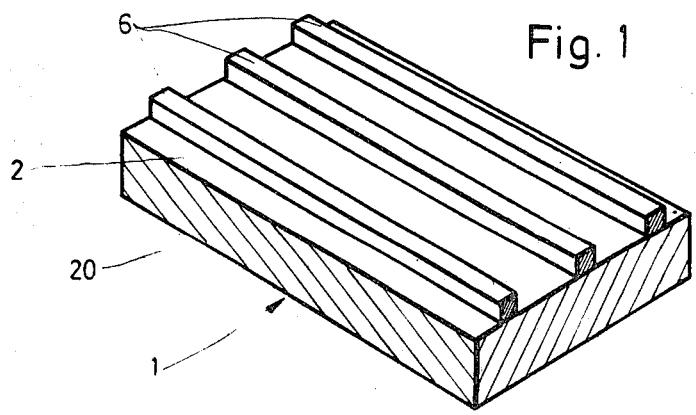
FIG. 1 is a perspective view of an article or a matrix which is to be formed in accordance with the invention.
Figure 2:
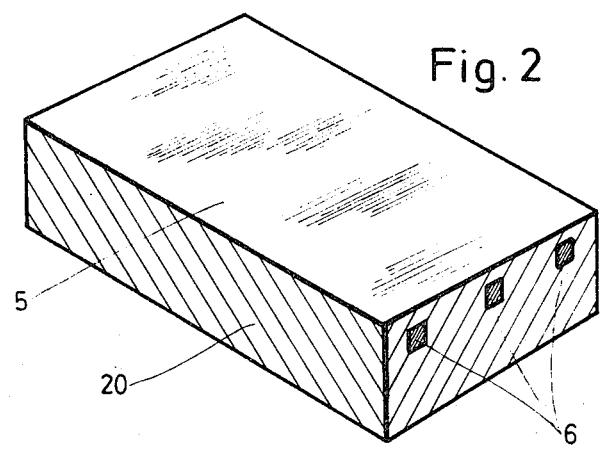
FIG. 2 is a view similar to FIG. 1 of the completed article.

Referring to the drawings in particular, the invention embodied therein in FIG. 1 comprises a receiving matrix or article of manufacture generally designated 1 which comprises a plate 20 which is only partly shown and which during the course of its manufacture in accordance with the method of invention, includes an intermediate face or surface 2 which is provided with filler materials in the form of a plurality of longitudinally, transversely or obliquely extending reinforcing strips or metal rods 6. The layer of the plate 20 which has been finished to the point indicated in FIG. 1 may be a metal plate formed in any manner but the remaining portion is formed either by starting or finishing the electro-plating of the surface 2 to cause the filler material to become embedded, partly or completely, in the deposited galvano plastic or electro-plater material 5 which becomes part of the whole material of the plate 20. The finished plate 20 looks as indicated in FIG. 2 and it should be appreciated that there is not a difference between the part of the matrix which was finished already in FIG. 1 with that of the remaining 5 which is carried on by electro-plating.

Figure 3:
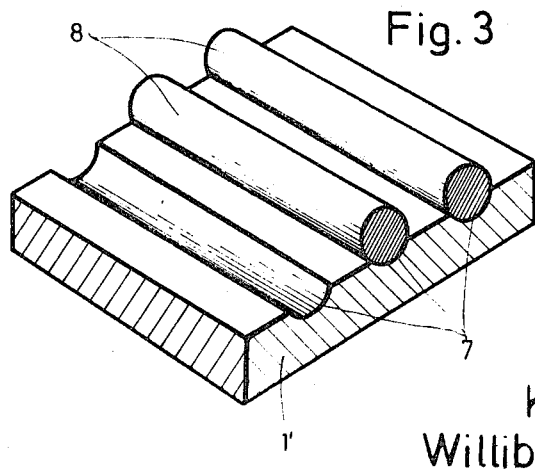
FIG. 3 is a perspective view similar to FIG. 1 of another embodiment of the invention.

In accordance with the method of the invention, it is sometimes advantageous if the receiving material such as a receiving plate 1', as indicated in FIG. 3 is provided with a plurality of recesses or grooves 7 of a configuration corresponding to the outline of the filler material which is employed. In the embodiment of FIG. 3, the filler material comprises cylindrical reinforcing rods or strands 8. The formation of the grooves 7 ensure that the bonding of the rods within the finished plate will not be incomplete and hence not tightly fitting both the previous material and the material which is subsequently applied by electro-plating. With such an arranagement there will be no tendency to great field distortions and thus there will be no unsatisfactory thickened area of material which has been electroplated nor will there be any tendency to form cavities.

Figure 4:
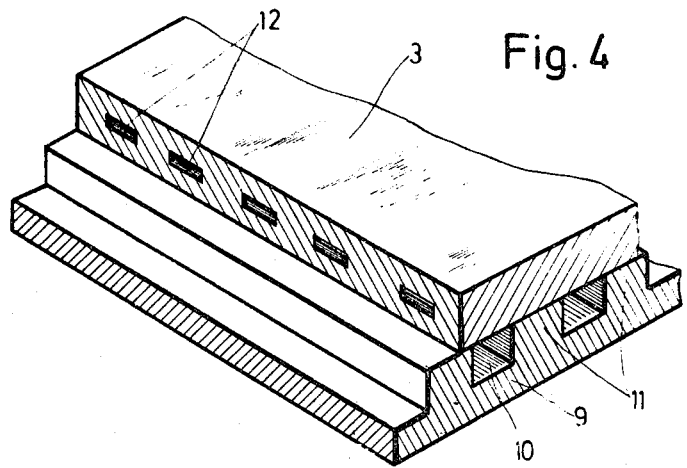
FIG. 4 is a view similar to FIG. 1 of still another embodiment of the invention.

In the embodiment of FIG. 4, a metallic body such as the interior wall of a thrust engine combustion chamber 9 is provided with cooling channels 10 on its exterior surface. The cooling channels 10 are separated by web portions 11 of the wall 9. With this construction, an electro-deposited covering or coating 3 is applied to close off the channels 10 and this whole structure is reinforced by circumferentially applied filler elements or strips 12 which are bonded within the electro-deposited top coating 3. In the showing of FIG. 4, the wall 9 is shown in a distinct manner from the top coating 3 but the electro-depositing will permit a uniform formation of this whole structure. Generally sepaking the channels are maintained free of electro-deposited material by inserting a non-reactive substance into these channels during the electro-plating operation.

Figure 5:
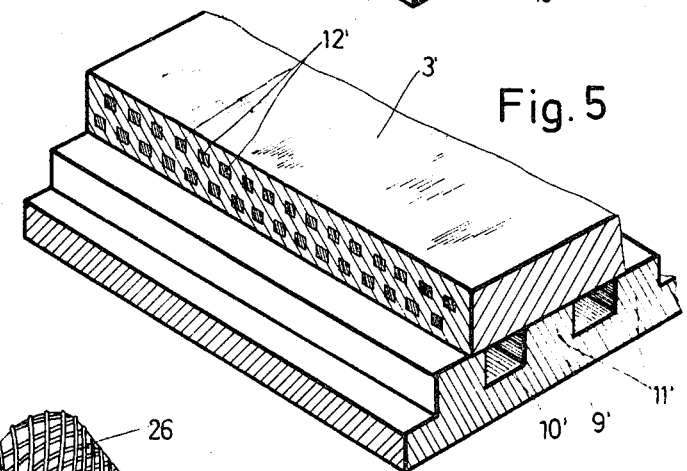
FIG. 5 is a view similar to FIG. 1 of still another embodiment of the invention.

In the embodiment of FIG. 5, there is provided a plate structure 9' having channels 10' which are separated by webs 11' and which is bonded to a coating 3' of electro-deposited material in which there are several successive layers of reinforcing bands 12' which are arranged one over the other proceeding in an outward direction and which may be either aligned or offset as desired. The embodiments of FIGS. 4 and 5 show that the arrangement of the filler material may be varied as desired in order to produce the desirable structural strength in the particular direction in which the stress forces may act. The filler material in the form of bands 12 or 12' may be wound around a cylindrical wall 9 or 9' during the electro-plating process or directly before the process.

Figure 6:
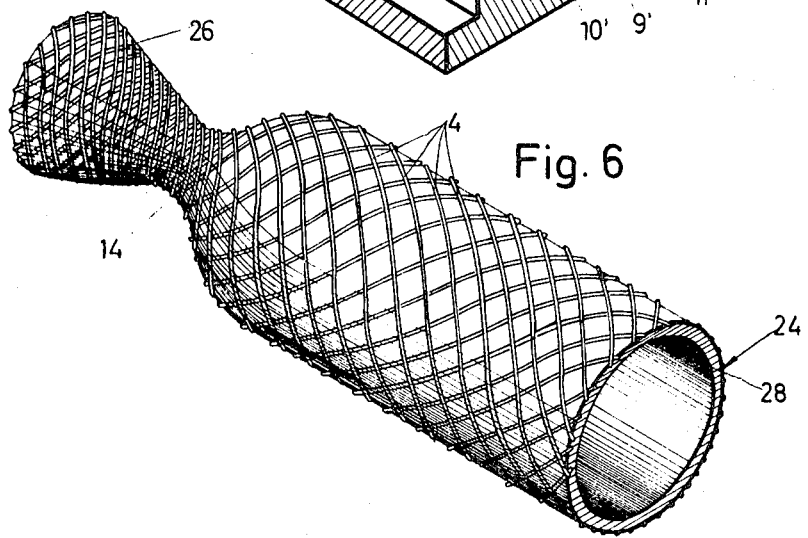
FIG. 6 is a top perspective view of a portion of a rocket engine constructed in accordance with the invention.

In the embodiment of FIG. 6, there is provided a thrust engine or rocket engine, generally designated 24, which includes a cylindrical portion which is closed at one end by a head (not shown) and which includes another end with a nozzle 26 for the discharge of gases and which includes a narrowed or neck portion 14. In this embodiment, a mesh of reinforcing material 4 is arranged over a partly finished wall 28 having longitudinal cooling channels (not shown) but of a type similar to those shown at 10 in FIG. 4, and the wall is completed by an outer layer of electro-plated material thereon. The mesh 4 is of a form chosen to withstand the main stress directions of the operation of the rocket engine 24. A smaller spacing of the interconnected filaments of the meshes must be provided in the range of the nozzle neck portion 14 so that the necessary strength increase is achieved at this location of greatest surface stress. If a simple wire mesh 4 should not be sufficient, it is possible by repeated interruption of the electro-plating process to arrange several such filler layers wound in the same or different manner as desired.

The invention is applicable to many types of construction and to articles such as pressure pipes, pressure tanks, and the gun barrels and similar articles which are subject to stress. Materials of different properties can be combined with each other by electro-plating in accordance with this invention. For example, in the rocket combustion chamber construction as indicated in FIG. 6, a material of great thermal conductivity such as copper can be used for the wall formation which by itself would not have the desired strength. In order to obtain the desired strength the mesh 4 is made of a steel or a spring steel wire which is covered by an electro-plated copper material. In this manner a good thermal conductivity of the copper and thus a satisfactory cooling of the rocket combustion chamber is maintained while it is still possible to maintain the wire at the desired strength which is necessary for satisfactory operation by use of the wire mesh.

What is claimed is:

1. A method for incorporating a strength increasing filler material into an article which may be produced wholly or partly by electro-plating, comprising defining an exposed surface on the article with a receiving groove for the filler material, arranging the filler material in the receiving groove on the exposed surface of the article, and electro-plating the surface to bond the material within the finished wall which is built up by electro-plating.

2. A method, according to claim 1, wherein the surface of the article to be electro-plated is provided with a plurality of said grooves corresponding to the outline of the reinforcing filler material to be applied thereto, and including arranging the filler material into the associated grooves and thereafter carrying out the electro-plating to form the wall of the article around the filler material.

3. A method, according to claim 2, wherein said grooves are at least partly adapted to the form of the filler material.

4. A method, according to claim 1, wherein a reinforcing band of great strength is used as the filler material.

5. A method, according to claim 4, wherein said band is wound about the article to be formed.

6. A method, according to claim 5, wherein the winding is effected to form a wire mesh of filler material.

7. A method, according to claim 5, wherein the winding is adapted to the direction of the main stresses of the finished article.

8. A method, according to claim 1, wherein several layers of filler material are electro-plated into the finished wall structure by successive deposits of electro-plated material.

9. A method, according to claim 1, wherein the filler material is completely covered by electro-plated material.

10. A method, according to claim 1, wherein the filler material comprises a reinforcing band, the workpiece comprising a cylindrical matrix around which said band is wound.

11. A method, according to claim 10, wherein said band is wound to form a mesh, the openings of the mesh being selected proportional to the diameter of the respective portion of the article.

12. A method, according to claim 1, wherein the article is made of a copper, the filler material comprising a reinforcing steel.

13. A method, according to claim 1, wherein a rocket engine is formed by the article, the article being reinforced by a winding of filament material thereon and a deposit of electro-plated material over the filler material.

14. A method, according to claim 1, wherein the article comprises a cylindrical matrix employed as a gun barrel, a filler material comprising a steel wound around said gun barrel.

15. A method, according to claim 1, wherein the article comprises a high pressure tank, said filler material comprising a continuous winding in the form of a mesh surrounding said tank.

16. A method of forming a portion of the interior wall of a rocket engine, comprising forming a wall with a plurality of longitudinally extending opened top cooling channels, forming an electro-plated surface over the opened top cooling channels while the channels are protected from being filled with the electro-plated material, adding a reinforcement filler material in the form of a continuous strand onto the electroplated material and completing the formation of the wall by a continued deposit of electro-plated material to incorporate the reinforcing strand into the material and completing the outer portion of the wall and to close the top of all of said channels.

17. A method of constructing a rocket engine according to claim 16, wherein said strand is applied around the exterior of said wall during the electro-deposit of material thereon.

18. A method, according to claim 16, wherein the plurality of strands are applied in the form of a mesh and electro-plating material is deposited over the bands to complete the wall structure.

19. A method, according to claim 18, wherein said strands are applied in layers.

References Cited

UNITED STATES PATENTS

| | | | |
|---|---|---|---|
| 1,646,602 | 10/1927 | Smith | 204—3 |
| 2,641,439 | 6/1953 | Williams | 204—3 |
| 1,757,543 | 5/1930 | Ord | 204—9 |
| 3,505,177 | 4/1970 | Chester et al. | 204—16 |

FOREIGN PATENTS

| | | | |
|---|---|---|---|
| 85,713 | 5/1895 | Germany | 204—3 |
| 1,139,817 | 1/1969 | Great Britain | 204—16 |

OTHER REFERENCES

The Electroforming of Composites by J. C. Withers and E. F. Abrams, Plating, June, 1968, pp. 605–611.

GERALD L. KAPLAN, Primary Examiner

T. TUFARIELLO, Assistant Examiner

U.S. Cl. X.R.

29—191.6; 60—260; 156—150, 169; 204—9